US009934533B1

(12) United States Patent
Griffith

(10) Patent No.: US 9,934,533 B1
(45) Date of Patent: Apr. 3, 2018

(54) SYSTEM AND METHOD FOR SINGLE ACTION SELLING OF EVENT TICKET

(71) Applicant: Gametime, San Francisco, CA (US)

(72) Inventor: Bradley Griffith, San Francisco, CA (US)

(73) Assignee: Gametime, San Francisco, CA (US)

( * ) Notice: Subject to any disclaimer, the term of this patent is extended or adjusted under 35 U.S.C. 154(b) by 666 days.

(21) Appl. No.: 14/516,541

(22) Filed: Oct. 16, 2014

Related U.S. Application Data

(60) Provisional application No. 61/892,394, filed on Oct. 17, 2013.

(51) Int. Cl.
*G06Q 30/06* (2012.01)
*G06Q 30/02* (2012.01)
*G06Q 30/08* (2012.01)
*G06K 9/00* (2006.01)

(52) U.S. Cl.
CPC ......... *G06Q 30/08* (2013.01); *G06K 9/00469* (2013.01); *G06Q 30/0283* (2013.01); *G06Q 30/06* (2013.01)

(58) Field of Classification Search
None
See application file for complete search history.

(56) References Cited

U.S. PATENT DOCUMENTS 7,039,423 B2 * 5/2006 Daniel ................ H04L 12/1859 455/414.3
7,945,463 B2 * 5/2011 Sussman ................ G06Q 10/02 705/1.1
8,032,442 B2 * 10/2011 Fluhr ..................... G06Q 30/06 705/35
8,294,549 B2 * 10/2012 Samovar ........... G07C 9/00103 235/379
2003/0013439 A1 * 1/2003 Daniel ................ H04L 12/1859 455/422.1
2003/0061147 A1 * 3/2003 Fluhr ..................... G06Q 30/06 705/37
2004/0006497 A1 * 1/2004 Nestor .................. G06Q 10/02 705/5
2005/0021450 A1 * 1/2005 Nakfoor .................. G06F 21/33 705/37
2007/0055554 A1 * 3/2007 Sussman ................ G06Q 10/02 705/5
2007/0276944 A1 * 11/2007 Samovar ........... G07C 9/00103 709/225
2008/0162211 A1 * 7/2008 Addington ............ G06Q 10/02 705/14.5
2008/0312938 A1 * 12/2008 Toole ..................... G06Q 30/06 705/1.1
2010/0217679 A1 * 8/2010 Eckstein ............. G06Q 20/102 705/26.1
2011/0045852 A1 * 2/2011 Kovach .................. G06Q 30/02 455/466
2014/0114789 A1 * 4/2014 Groarke ................ G06Q 30/08 705/26.3

OTHER PUBLICATIONS

Spenner, E.L., et al., "Demand for NFL Attendance: A Rational Addiction Model," Journal of Business and Economics Research, vol. 8, No. 12, pp. 21-41, Dec. 2010.*

* cited by examiner

*Primary Examiner* — Nicholas D Rosen
(74) *Attorney, Agent, or Firm* — FSP LLC

(57) ABSTRACT

A system transforms one or more inputs to determine a price for a ticket and presents this price for single action selection.

5 Claims, 6 Drawing Sheets

WEATHER STATION 202
WEATHER SIGNALS
WEATHER METRIC MODULE 216
TRANSACTION DATABASE 214
BID HISTORY SIGNALS
WEATHER METRICS
BID TRACKER 212
RAW BIDS
BID RATE MODULE 220
CAMERAS 204
STADIUM/PARKING IMAGES
CROWD ESTIMATOR MODULE 218
CROWD ESTIMATE SIGNALS
BID VELOCITY AND ACCELERATION SIGNALS
CLOCK 206
TIME SIGNALS
PRICING ENGINE 108
LOCATION SIGNALS
GPS 208
LOCATION SIGNALS
CLIENT DEVICE 210

SYSTEM AND METHOD FOR SINGLE ACTION SELLING OF EVENT TICKET

CROSS-REFERENCE TO RELATED APPLICATIONS

This application claims priority and benefit under 35 U.S.C. 119 to application serial number U.S. 61/892,394, filed on Oct. 17, 2013, and incorporated herein by reference in its entirety.

BACKGROUND OF THE INVENTION

People with one or more tickets to an event (e.g., a sporting match) may have unused tickets available. This may present an opportunity for buyers, especially late buyers, who want tickets.

Online ticket markets are available (e.g., Stubhub™), but these require the ticket holder to be knowledgeable about price trends, and to invest time-intensive monitoring to secure an optimal price. Online services usually involve account setup and manual data entry related to the potential transaction/tickets.

Tickets have perishable value and the above constraints lead to situations where tickets go unsold and unused. Ticket owners lose sales, and event venues lose ancillary revenues (e.g., concessions).

BRIEF SUMMARY OF THE INVENTION

A system is described that allows ticket holder to sell, donate, gift or otherwise transfer ownership of one or more tickets to an event with a single action/interaction. The system does not incur delays for identifying a matching buyer. This system removes the need for the seller to set a price and monitor for bids. The system shifts economic surplus in the ticket market toward the ticket seller.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION OF THE INVENTION

Glossary

Figure 1:
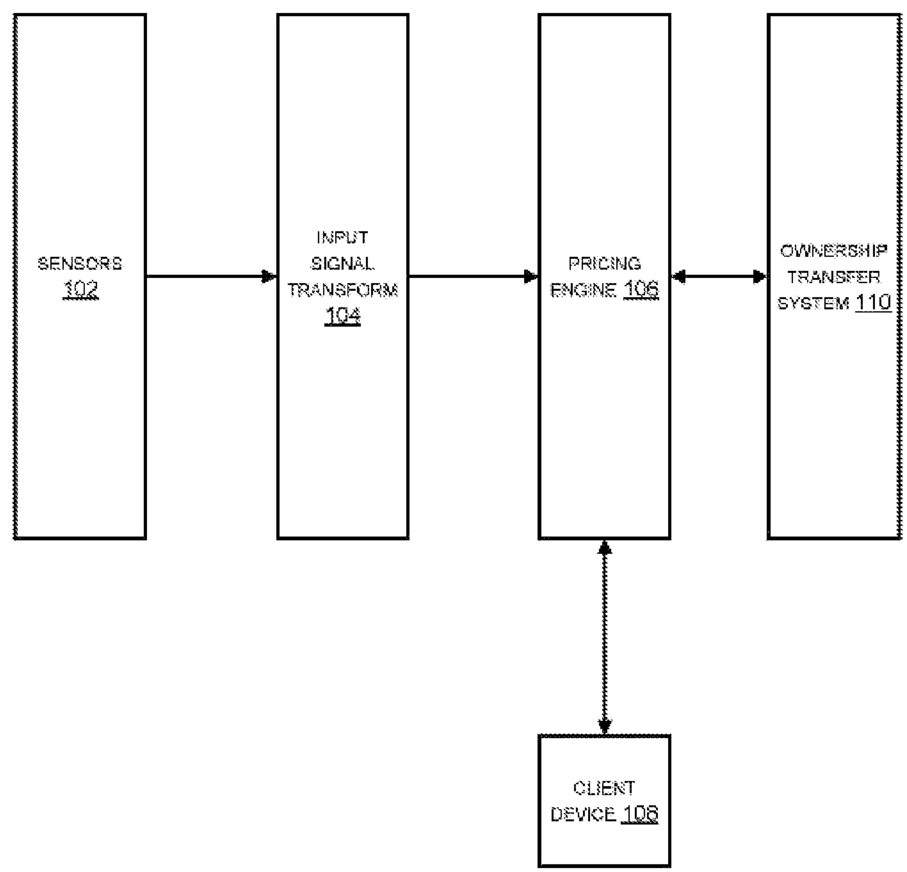
FIG. 1 a high level block diagram of an embodiment of a ticket pricing and exchange system.

"Sensor" in this context refers to a device or composition of matter that responds to a physical stimulus (as heat, light, sound, pressure, magnetism, or a particular motion) and transmits a resulting impulse (as for measurement or operating a control). 'machine interface' in this context refers to one or more sensors coupled to machine logic such that signals generated by the sensors in response to physical events influence the logic and thus the actions of the machine. 'signal' in this context refers to one or more energy impulses that convey control commands, data, or attributes between machine elements or between people, or a combination of machines and people. Any physical entity exhibiting variation in time or variation in space is potentially a signal. Examples of signals are electrical impulses such as analog or binary electrical phenomenon, audio, video, speech, image, communication, geophysical, sonar, radar, and musical signals. 'mobile device' refers to a machine that is portable by a human operator and which communicates with other machines using one or more wireless signaling circuits (often in the radio frequency or optical frequency range). 'camera' in this context refers to a device that records images and/or video, either as analog or as digital information signals. 'image' in this context refers to information captured and stored by a device representing a visual perception, usually a two-dimensional picture. Images may be captured, stored, and communicated by devices in either analog or digital formats. 'video' in this context refers to information captured and stored by a device representing a sequence of moving pictures. Video may be captured, stored, and communicated by devices in either analog or digital formats. 'client device' refers to a device that operates in the role of a client in a client-server machine communication system. 'clock' refers to a machine that generates a timebase which can be accumulated and translated into an indication of a time, date, or both. 'GPS' in this context refers to (Global Positioning System) a space-based satellite navigation system that provides location and time information in most weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver. 'image' in this context refers to information captured and stored by a device representing a visual perception, usually a two-dimensional picture. Images may be captured, stored, and communicated by devices in either analog or digital formats.

DESCRIPTION

Embodiments of a system are described that transform one or more inputs from sensors and other sources to determine a price for a ticket and presents this price for single action selection on a user machine interface. Ticket pricing may be influenced by many factors, including:

1. current time relative to event time
2. projected crowd and capacity
3. recent transaction prices and trends; including velocity and acceleration of sales
4. weather and other exogenous events (traffic, parking, availability of transit)
5. ticket quality (e.g., ticket section, seat number)
6. list price of ticket
7. bid landscape for similar tickets
8. ticket buyer or ticket holder location
9. ticket buyer or ticket holder transaction history
10. macroeconomic conditions The system accumulates demand signals from users interested in acquiring event tickets. The system produces an instant price and offer which is presented to the ticket holder. The ticket holder has the option to accept the offer via single action/interaction with their mobile device. If the ticket holder does not accept the offer, they may continue to receive future offers based on continuous monitoring of the market for their ticket by the system, leading to updated offers and alerts.

The system enables a process of competitive pricing for tickets to an upcoming event for which the time window is closing. The illustrated system may influence and present the price of tickets so that ticket holders can complete a ticket transfer with a single action. The presented prices are influenced by various factors in a unique way.

A set of sensors output signals responsive to environmental factors. These may include weather conditions, crowd conditions, parking and transportation conditions, bid velocity and acceleration, and other factors.

DRAWINGS

FIG. 1 is a high level block diagram of an embodiment of a ticket pricing and exchange system. The signals from the sensors 102 are input to a signal transform module 104 which performs transformations on the signals suitable for analysis by a pricing engine 106. Transformations vary according to the signal and the type of information is to be extracted from the signal. For example, transformations on weather station inputs produce values for analysis as to whether outdoor performances will be comfortable, of particular quality, or partially or totally disrupted. Transformation of images from cameras may identify masses of people and/or vehicles and change characteristics of those masses. The pricing engine 106 communicates with a client device 108 (e.g., a mobile device) to present a seller with a current price for their ticket and a machine interface for single-action transfer of their ticket into the system. The determination of price presented to the user of the client device 108 is influenced by factors produced by signal transform module 104 as determined by transformation the signals from the sensors 102. An ownership transfer module 110 effects a transfer of ownership of a ticket to the system, from which it may be transferred to buyers/others, in response to a single user action on the machine interface of the client device 108 indicating acceptance of the price for the ticket presented by the pricing engine 106.

Figure 2:
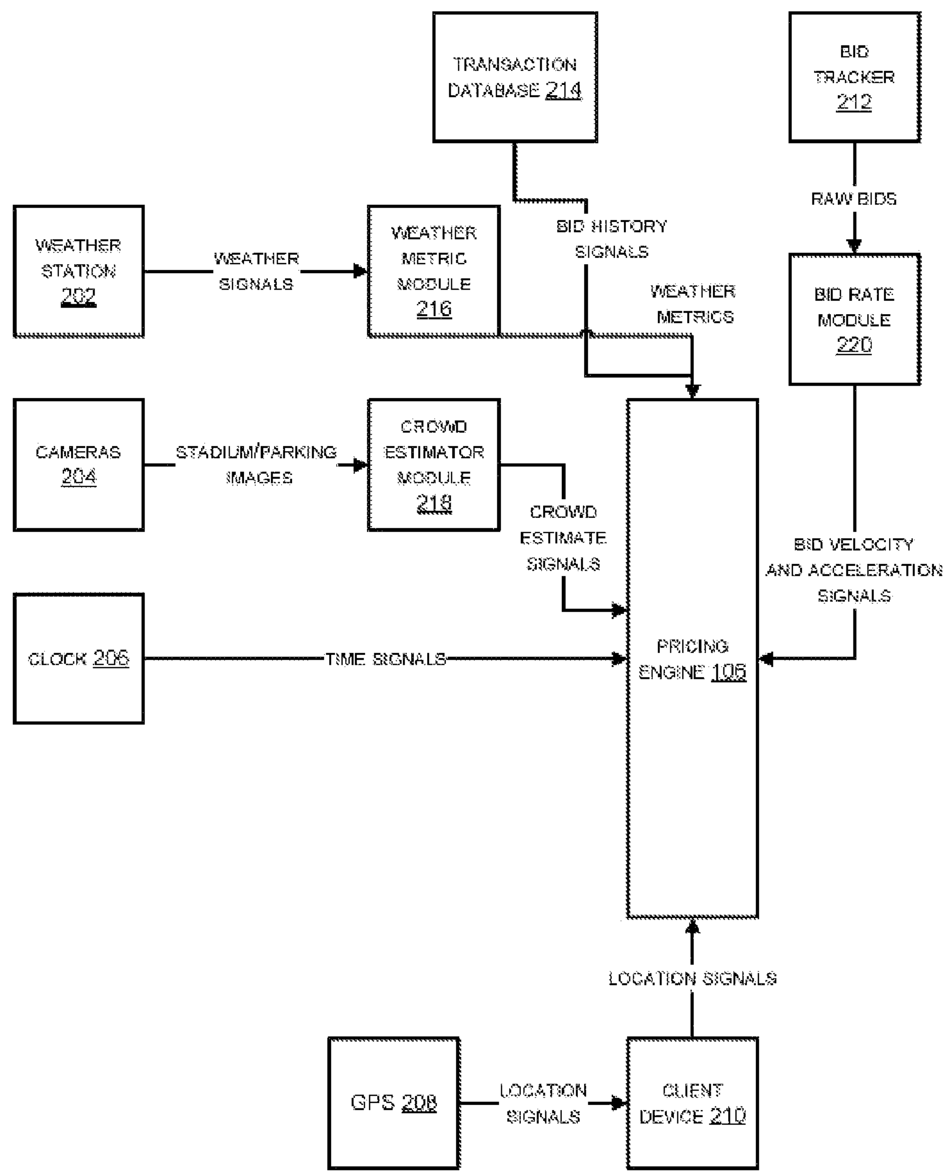
FIG. 2 a more detailed block diagram of an embodiment of a ticket pricing and exchange system.

FIG. 2 is a more detailed block diagram of an embodiment of a ticket pricing and exchange system. FIG. 2 is a more detailed block diagram of an embodiment of a ticket pricing and exchange system. Sensors 102 may include one or more weather stations 202, cameras 204, clocks 206 and GPS 208. GPS 208 senses signals of wireless and electromagnetic nature from geo-synchronized satellites and indicative of geometric latitude and longitude coordinates on the earth's surface, as well as possibly indicative of altitude. GPS 208 may thus sense locations of a ticket owner's client device 108, as well as locations of the devices of potential buyers/recipients of the ticket. The clock 206 generates a periodic output signal in response to the behavior of an internal oscillator device. The periodic signal may be utilized to track a current time and window of time before an event to which a ticket applies. A weather metrics module 216 produces weather metrics such as a comfort level based on signals from the weather station 202 indicative of outdoor temperature, wind, barometric pressure, precipitation, fog, etc. A crowd estimator 218 produces crowd estimates in response to signals input from the camera sensors 204. The crowd estimator 218 may receive image or video signals from the camera sensors 204 and may analyze these signals for lines, clusters, or distributions of people or vehicles at entries, gates, parking facilities, concessions, etc. and may further analyze changes to these structures over time for growth characteristics.

Signals from the various sensors and transformation modules are input to the pricing engine 106 to influence the price presented for the ticket on the client device 210 of a ticket holder. Other input to the price engine 106 can include signals from a transaction database 214. The transaction database signals may indicate prices transacted for similar quality tickets to similar events in similar circumstances. A tracking module 212 may track pricing trajectories for similar tickets in similar circumstances.

Figure 3:
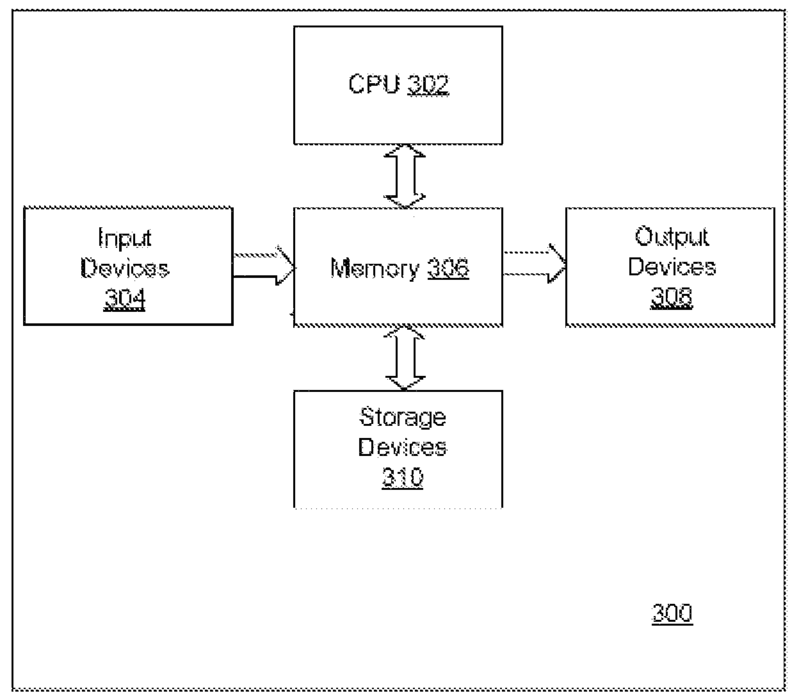
FIG. 3 illustrates an embodiment of a machine device which can implement various actions described herein (either client or server or intermediate device).

FIG. 3 illustrates an embodiment of a machine device which can implement various actions described herein (either client or server or intermediate device). FIG. 3 illustrates an embodiment of a machine device which can implement various actions described herein (either client or server or intermediate device). Input devices 304 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 304 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 304 are provided via various machine signal conductors (e.g., busses or network interfaces) and circuits to memory devices 306. The memory devices 306 is typically what is known as a first or second level memory device, providing for storage (via configuration of matter or states of matter) of signals received from the input devices 304, instructions and information for controlling operation of the CPU 302, and signals from storage devices 330. Information stored in the memory devices 306 is typically directly accessible to processing logic 302 of the device. Signals input to the device cause the reconfiguration of the internal material/energy state of the memory device 306, creating in essence a new machine configuration, influencing the behavior of the device 300 by affecting the behavior of the CPU 302 with control signals (instructions) and data provided in conjunction with the control signals. Second or third level storage devices 330 may provide a slower but higher capacity machine memory capability. Examples of storage devices 330 are hard disks, optical disks, large capacity flash memories or other non-volatile memory technologies, and magnetic memories. The processing logic 302 may cause the configuration of the memory 306 to be altered by signals in storage devices 330. In other words, the CPU 302 may cause data and instructions to be read from storage devices 330 in the memory 306 from which may then influence the operations of CPU 302 as instructions and data signals, and from which it may also be provided to the output devices 308. The CPU 302 may alter the content of the memory of 306 by signaling to a machine interface of memory 306 to alter the internal configuration, and then converted signals to the storage devices 330 to alter its material internal configuration. In other words, data and instructions may be backed up from memory 306, which is often volatile, to storage devices 330, which are often non-volatile. Output devices 308 are transducers which convert electrical, optical, or wireless signals into physical phenomenon such as vibrations in the air, or patterns of light on a machine display, or vibrations (i.e., hepatic devices) or patterns of ink or other materials (i.e., printers and 3-D printers).

Figure 4:
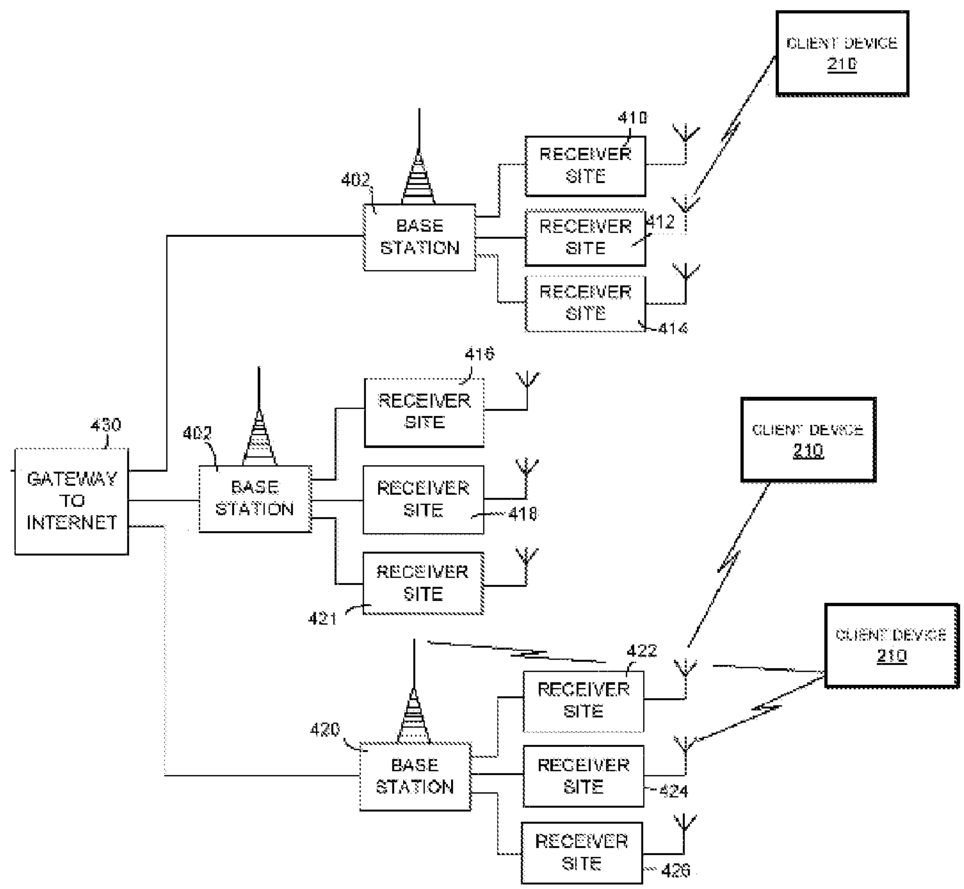
FIG. 4 illustrates a machine communication network for implementing certain aspects of a ticket pricing and exchange system.

FIG. 4 illustrates a machine communication network for implementing certain aspects of a ticket pricing and exchange system. FIG. 4 illustrates a machine communication network for implementing certain aspects of a ticket pricing and exchange system. Client devices 210 interface wirelessly to receiver sites 410-418 and 421-426. Receiver sites may be what is commonly known as cell towers, comprising antennas which both transmit and receive wireless information in overlapping zones within which the receiver sites tend to be centrally located at higher elevation. Multiple receiver sites are typically connected to a base station 402. The connection between receiver sites and base stations is often a wired connection, meaning through the infrastructure of a wide area network or dedicated cables, for example. However, the connection may also be wireless especially in dense urban zones or in sparse rural settings. The base stations 402 in turn are connected to wider area network such as the global Internet through a gateway device 430. In this manner communications from the client devices 210 are initially transmitted wirelessly to receiver sites 410-418, 421-426 and from there propagated through base stations 402 to an Internet gateway 430, from which they may be communicated to a server system such as the ticket transfer system described herein.

Figure 5:
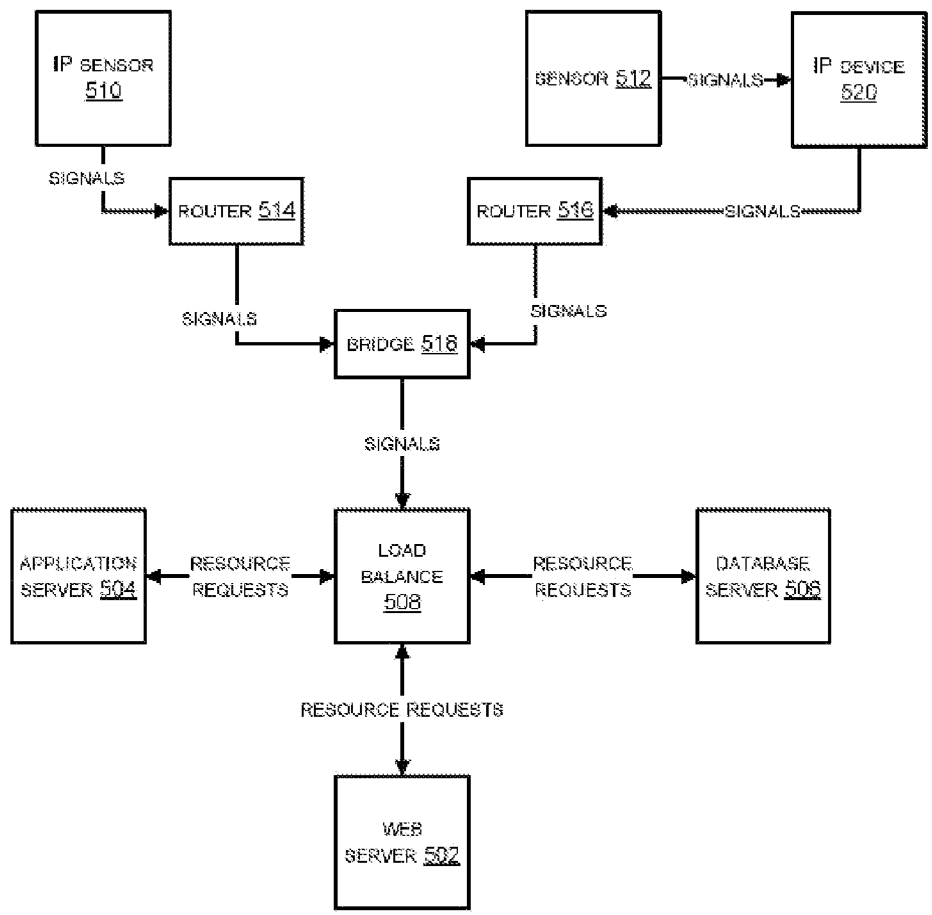
FIG. 5 illustrates the exemplary of an embodiment a machine system for converting signals output from sensors into an indication of ticket price.
Figure 6:
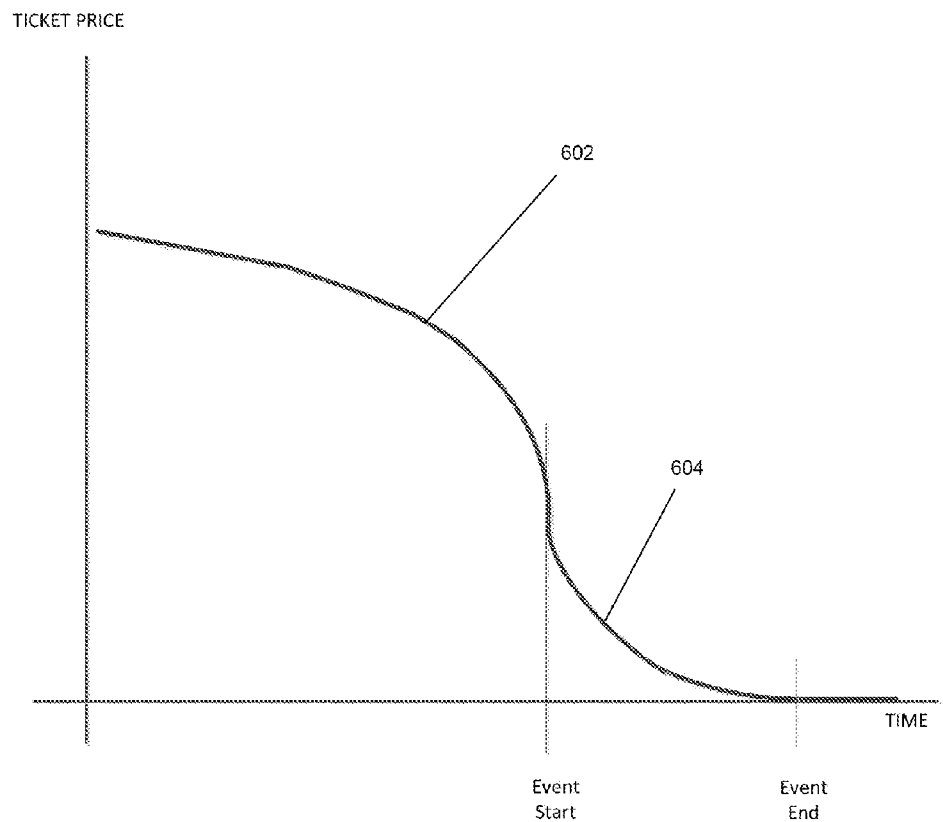
FIG. 6 illustrates an embodiment of time-based pricing for a ticket transaction system.

FIG. 5 illustrates the exemplary of an embodiment a machine system for converting signals output from sensors into an indication of ticket price. FIG. 5 illustrates the exemplary of an embodiment a machine system for converting signals output from sensors into an indication of ticket price. An IP sensor 510 responds to a physical stimulus from the environment with output signals that in some way represent the physical phenomenon. The signal is output in Internet Protocol (IP) format, and propagated via a router 514 and a bridge 518 to a server system. Another sensor 512 does not have IP protocol capability and so outputs signals in a different (e.g., analog) format to an IP device 520 which converts the signals output by the sensor 512 into an IP protocol and communicates them via a router 516 and bridge 518 to the server system. The server system comprises a number of separate server devices, typically each implemented in the separated machine, although this is not necessarily the case. The signals from the sensors are provided via a load balancing server 508 to one or more application server 504 and one or more database server 516. Load balancing server 508 maintains an even load distribution to the other server, including web server 502, application server 504, and database service 506. Each server in the drawing may represent in effect multiple servers of that type. The signals from the sensors 510, 512 influence one or more processors of the application server 504 to produce a signal indicative of and affecting a price competition, for example, signals indicative of inclement weather conditions and signals from a camera indicative of crowd conditions may be applied to the application server's processor and memory internal devices to influence the production of a price-affecting signal. Database service 506 may provide signals in response to resource request indicative of the sellers of the tickets, transaction history or prices for similar tickets being offered under similar circumstances. The signals applied to the database server 506 may cause the database server 506 to access and certain memory addresses, which correlates to certain rows and columns in a memory device. These signals from the database server 506 may also be applied to application server 504 via the load balancing server 508 to influence the computation of a signal representing price. The signals representing price are applied by the application server 504, via the load balancing server 508, to the web server 502, which in turn communicates the price information to client device of the ticket holder, and receives signals from the client device of the ticket holder indicative of a ticket transfer action FIG. 6 illustrates an embodiment of time-based pricing for a ticket transaction system. A logarithmic decay 602 is applied to the ticket price as event start time approaches. After the event start time has passed, an exponential decay 604 is applied to the ticket price.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A ticket transfer system, comprising:

a periodic clock device;

a server to accumulate demand signals generated by a plurality of client devices, the demand signals for access to an upcoming event;

a tracker applying an output of the periodic clock device to track a current time in relation to a window of time before the upcoming event;

algorithm logic adapted to apply the current time in relation to the window of time from the tracker and accumulated demand signals from the server to determine a logarithmic decay to a price of an electronic ticket as a start time for the event approaches, and an exponential decay to the price of the electronic ticket after the start time passes; and a user interface configured to be displayed on a machine display of a client device, the user interface periodically reconfigured by the server to display the ticket price in conjunction with a single action control, activation of the single action control:

effecting a transfer of ownership of the electronic ticket; and initiating one or more machines to regenerate the ticket and to send a regenerated version of the ticket to a client device of a purchaser of the ticket.

2. The ticket transfer system of claim 1, further comprising:

the algorithm logic obtaining inputs from sensors identifying physical locations of client devices of potential buyers of the ticket within a determined distance of a venue of the event and applying the locations to affect the ticket price.

3. The ticket transfer system of claim 2, further comprising:

logic adapted to apply traffic conditions to identify the potential buyers of the ticket.

4. The ticket transfer system of claim 1, further comprising:

logic adapted to apply bid velocity or bid acceleration for the ticket to the displayed price.

5. The ticket transfer system of claim 1, further comprising:

logic adapted to apply bidding history for tickets having similar properties as the ticket to affect the displayed price.

* * * * *